United States Patent
Miedema

(10) Patent No.: US 11,949,748 B1
(45) Date of Patent: Apr. 2, 2024

(54) METHOD AND SYSTEM FOR MANAGING A BLOCKING CALL BASED ON A TIMEOUT

(71) Applicant: CIENA CORPORATION, Hanover, MD (US)

(72) Inventor: David Miedema, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 0 days.

(21) Appl. No.: 18/171,978

(22) Filed: Feb. 21, 2023

(51) Int. Cl.
- *H04L 12/00* (2006.01)
- *G06F 9/54* (2006.01)
- *H04L 43/08* (2022.01)
- *H04L 67/50* (2022.01)

(52) U.S. Cl.
CPC ............. *H04L 67/50* (2022.05); *G06F 9/547* (2013.01); *H04L 43/08* (2013.01)

(58) Field of Classification Search
CPC ... G06F 16/245; G06F 9/547; H04L 63/0815; H04L 69/329; H04L 67/50; H04L 43/081
USPC ................... 709/203, 228; 707/770; 713/168
See application file for complete search history.

(56) References Cited

U.S. PATENT DOCUMENTS

| | | | |
|---|---|---|---|
| 7,024,556 B1* | 4/2006 | Hadjinikitas | H04L 63/0815 713/168 |
| 7,797,733 B1* | 9/2010 | Sallam | H04L 63/1416 726/4 |
| 10,095,562 B2* | 10/2018 | Otenko | G06F 9/546 |
| 2003/0061367 A1* | 3/2003 | Shah | H04L 69/329 709/228 |
| 2013/0208628 A1* | 8/2013 | Balasubramanian | H04W 76/16 370/259 |
| 2023/0099475 A1* | 3/2023 | Bhargava | G06F 16/245 707/770 |

* cited by examiner

Primary Examiner — Frantz Coby
(74) Attorney, Agent, or Firm — Guntin & Gust, PLC; Atanu Das

(57) ABSTRACT

Aspects of the subject disclosure may include, for example, transmitting a first message to a server. The first message includes a request for a service and a first timeout associated with the service. The request causes generation of a blocking call associated with the service on the client computing device. Further embodiments can include receiving, prior to the first timeout expiring, a second message from the server indicating that the service is in-progress, and transmitting a third message to the server. The third message comprises one of a first instruction to continue with the service as the blocking call or a second instruction to convert the blocking call to a non-blocking call associated with the service. Other embodiments are disclosed.

20 Claims, 6 Drawing Sheets

METHOD AND SYSTEM FOR MANAGING A BLOCKING CALL BASED ON A TIMEOUT

FIELD OF THE DISCLOSURE

The subject disclosure relates to method and system for managing a blocking call based on a timeout.

BACKGROUND

In a microservice architecture, determining a timeout for a service to complete can be a complex task. Different servers have different loads, and different application programming interfaces (APIs) on those servers can take different amounts of time to complete the service. Client computing devices do not always know in advance the amount of time for a given service operation. The client computing device can request the service as a blocking call with a timeout such that the client computing device waits for either the service to be completed by the server or moves on from the service after expiration of the timeout. A blocking call can be when a portion of a client computing device resources (e.g., processor(s), memory, etc.) are tied up in requesting the service from the server and waiting for the service to complete. This is done so that the client computing device can monitor and receive messages whether the service has been completed or failed to complete. In the case of a service failure, the client computing device can try to implement debugging or other troubleshooting techniques to determine the cause of the service failure. Infinite wait times are not feasible due to the failure conditions they can create, and short wait times can cause a dissociation between the client computing device and the server, in which the client computing device determines the service may not have completed but the server continues to process the service until it is completed, but is not able to notify the result to a client computing device, which may have timed out to move on to work on other tasks.

At the basic level, a server can advertise a worst-case time associated with completing a service to a client computing device, but it is often hard for the server to know what this worst-case time (e.g., from which the timeout can be based) should be, especially if the server then has other work to do that it does not know how long it can take to complete.

Implementing the service request as a non-blocking call can solve some of these setbacks, but it is difficult to move all service requests to non-blocking calls. Doing so complicates debugging and introduces more failure modes into microservice architecture system.

Blocking calls on delayed APIs can cause a client computing device to tie up resources for a long time and it may not be able to do the other work it needs to do with these resources. Timeouts can allow the client to prevent the tying up of resources indefinitely and to move on to perform other tasks with these resources, but can cause dissociation with the service.

Non-blocking calls allow the client to continue to do work, but are more difficult to debug/troubleshoot if all calls are made non-blocking. Timeouts may still be needed for cases where the server has a catastrophic failure, for example.

BRIEF DESCRIPTION OF THE DRAWINGS

Reference will now be made to the accompanying drawings, which are not necessarily drawn to scale, and wherein.

DETAILED DESCRIPTION

Figure 1:
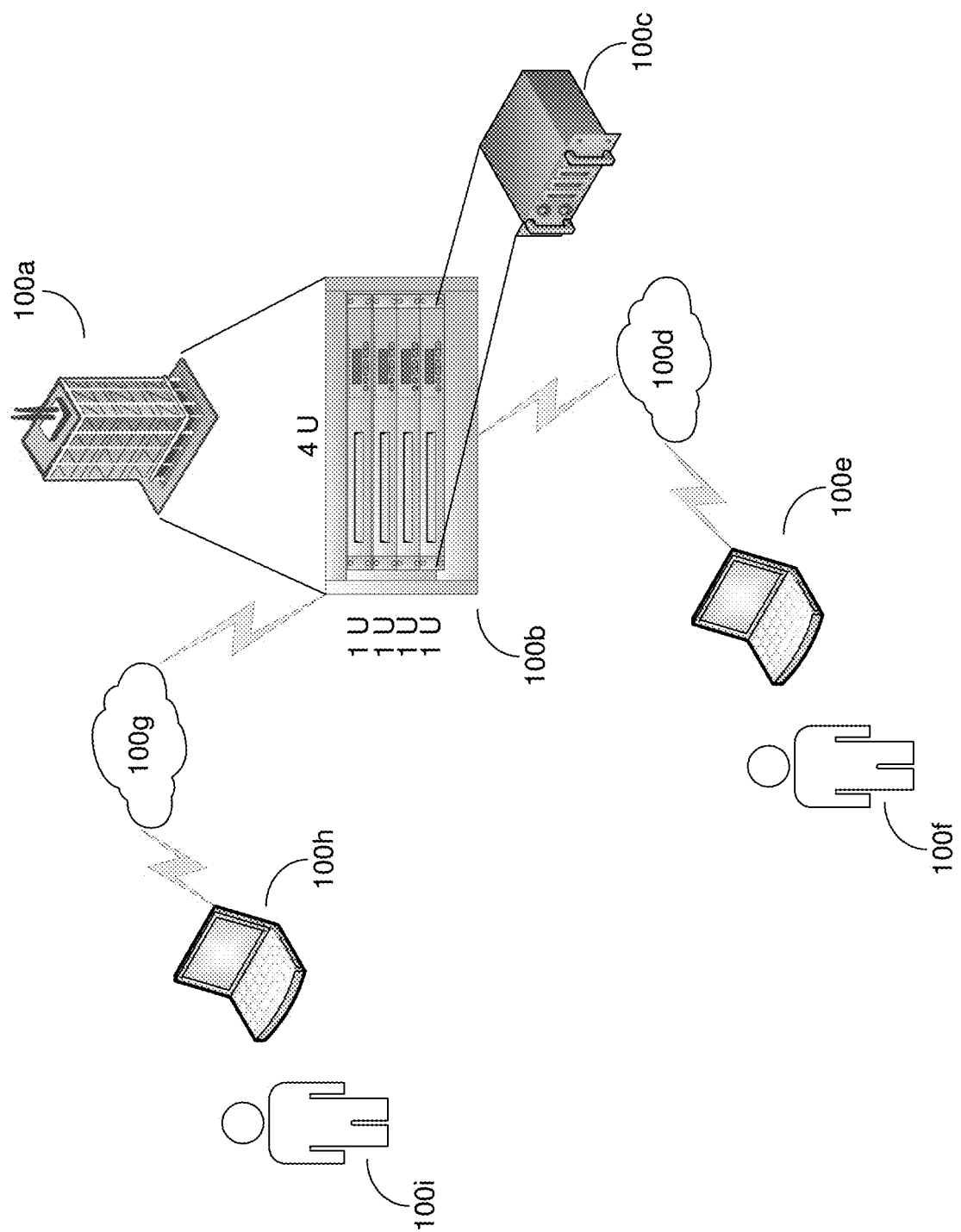
FIG. 1 and FIGS. 2A-2B are block diagrams illustrating example, non-limiting embodiments of a system functioning in accordance with various aspects described herein.

The subject disclosure describes, among other things, illustrative embodiments for transmitting a first message to a server. The first message includes a request for a service and a first timeout associated with the service. The request causes generation of a blocking call associated with the service on the client computing device. Further embodiments include receiving, prior to the first timeout expiring, a second message from the server indicating that the service is in-progress, and transmitting a third message to the server. The third message comprises one of a first instruction to continue with the service as the blocking call or a second instruction to convert the blocking call to a non-blocking call associated with the service. Other embodiments are described in the subject disclosure.

One or more aspects of the subject disclosure include a non-transitory machine-readable medium, comprising executable instructions that, when executed by a client computing device including a processor, facilitate performance of operations. The operations can comprise transmitting a first message to a server, wherein the first message includes a request for a service and a first timeout associated with the service. The request causes generation of a blocking call associated with the service on the client computing device. Further operations can comprise receiving, prior to the first timeout expiring, a second message from the server indicating that the service is in-progress, and transmitting a third message to the server. The third message comprises one of a first instruction to continue with the service as the blocking call or a second instruction to convert the blocking call to a non-blocking call associated with the service.

One or more aspects of the subject disclosure include a non-transitory machine-readable medium, comprising executable instructions that, when executed by a server including a processor, facilitate performance of operations. The operations can comprise receiving a first message from a client computing device, wherein the first message includes a request for service and a first timeout associated with the service. The request causes generation of a blocking call associated with the service on the client computing device. Further operations can comprise transmitting, prior to the first timeout expiring, a second message to the client computing device that indicates that the service is in-progress, and receiving a third message from the client computing device. The third message comprises one of a first instruction to continue with the service as the blocking call or a second instruction to convert the blocking call to a non-blocking call associated with the service.

One or more aspects of the subject disclosure include a method. The method can comprise transmitting, by a client computing device including a processor, a first message to a server. The first message includes a request for a service and a first timeout associated with the service, wherein the request causes generation a blocking call associated with the service on the client computing device. Further, the method can comprise receiving, by the client computing device, prior to the first timeout expiring, a second message from the server indicating that the service is in-progress, and transmitting, by the client computing device, a third message to the server. The third message comprises one of a first instruction to continue with the service as the blocking call or a second instruction to convert the blocking call to a non-blocking call associated with the service.

Figure 2A:
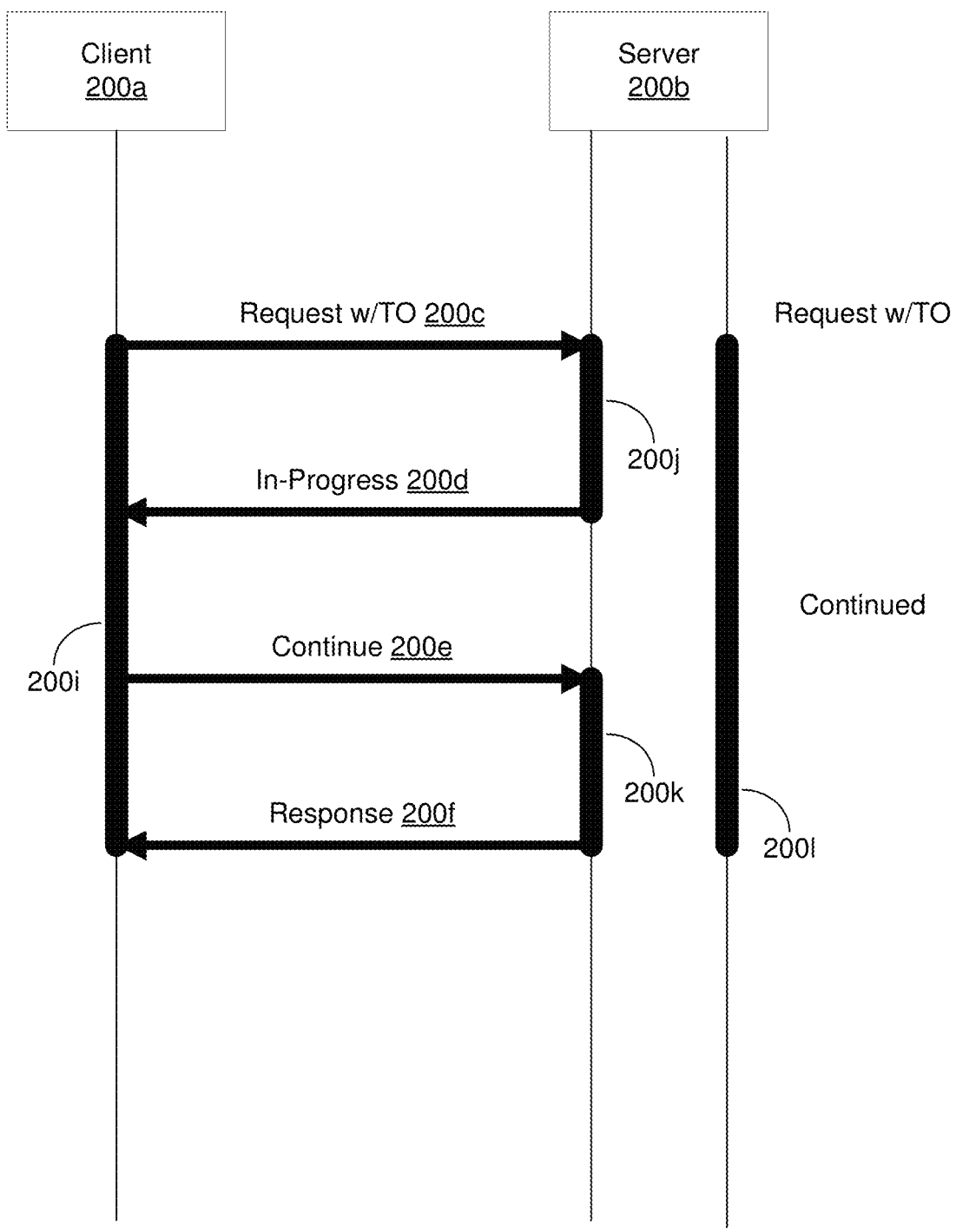
Figure 2B:
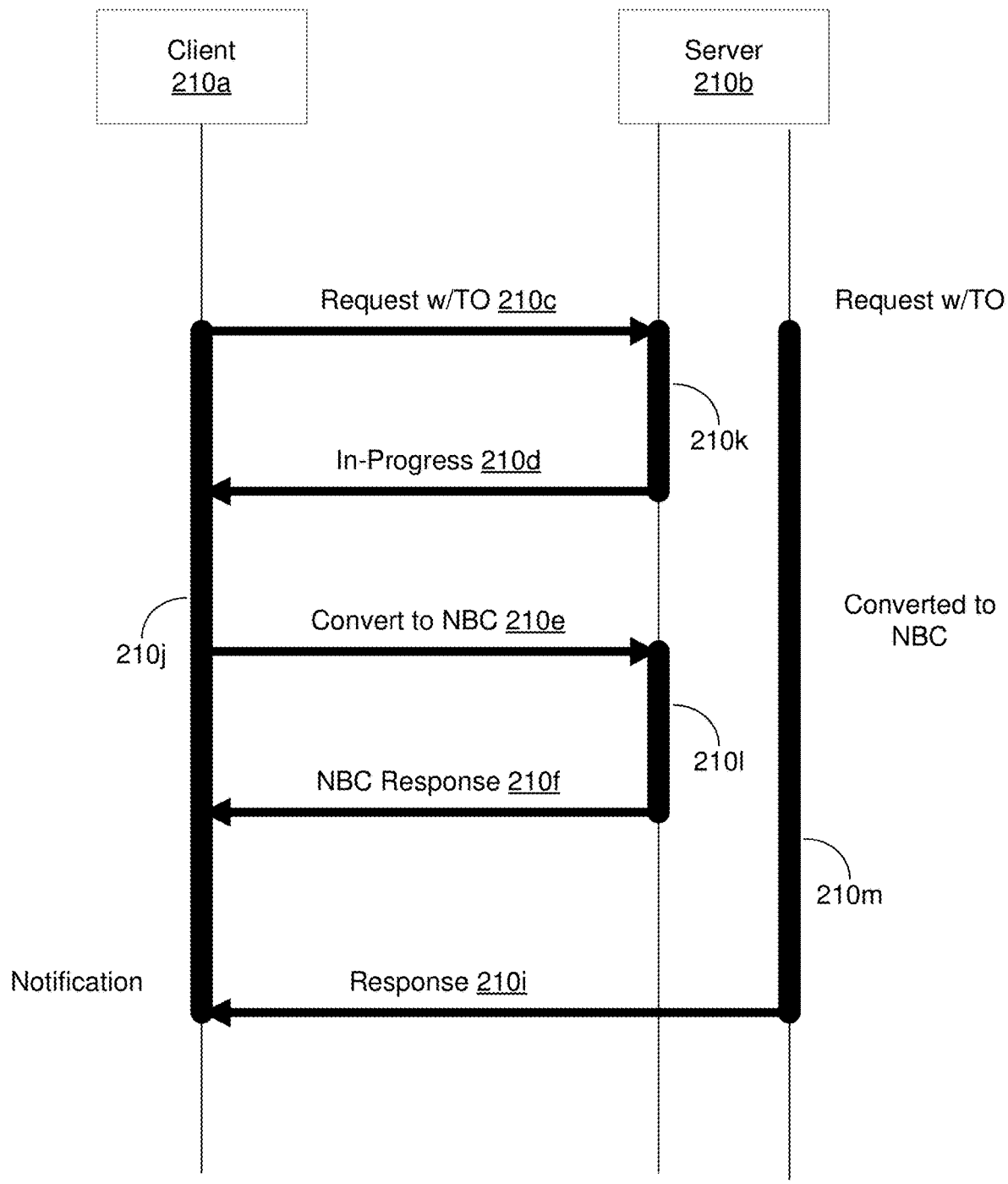

FIG. 1 and FIGS. 2A-2B are block diagrams illustrating example, non-limiting embodiments of a system functioning in accordance with various aspects described herein.

Referring to FIG. 1, in one or more embodiments, a client computing device, in response to user-generated input, requests a service from a server (e.g., a ftp file transfer, restart remote shelf, restore a database, apply a large configuration) as a blocking call. That is, a blocking call is when a portion of a client computing device resources (e.g., processor(s), memory, etc.) are tied up in requesting the service from the server, monitoring (e.g. for messages) the service, and waiting for the service to complete. This is done so that the client computing device can determine whether the service has been completed or failed to complete. In the case of a service failure, the client computing device can try to implement debugging or other troubleshooting techniques to determine the cause of the service failure. Further, the client computing device waits for the service to be completed before utilizing the resources allocated to the blocking call for another task.

In one or more embodiments, the client computing device can respond in several different ways to a delayed completion of a service by the server that includes continuing to wait for the service to be completed as blocking call, abandoning the service/blocking call, or converting the blocking call to a non-blocking call. A non-blocking call allows the client computing device to perform other tasks without tying up resources while waiting for the server to complete the service. However, the drawback of non-blocking call is that in case of a failure to complete the service and lack of monitoring by the client computing device, debugging/troubleshooting the cause of the failure can be complicated.

In one or more embodiments, system 100 comprises rack equipment 100b located in an operations center 100a of telecommunications or data network provider. One of the pieces of equipment in the rack equipment 100b can include server 100c. Administration personnel 100f, located on-site, can utilize a client computing device 100e to communicate with the server 100c over a communication network 100d to request a service. Further, administration personnel 100i, located off-site, can utilize a client computing device 100h to communicate with the server 100c over a communication network 100g. Each of client computing device 100e and client computing device 100h can include, but not limited to, a laptop computer, a desktop computer, a tablet computer, a mobile device, a mobile phone, a smartphone, or any other computing device. Each of communication network 100d and communication network 100g can comprise a wired communication network, a wireless communication network, or combination thereof. In some embodiments, local administration personnel 100f can directly connect client computing device 100e to server 100c via a communication cable.

In one or more embodiments, an example of a service request from a client computing device 100e, initiated by administration personnel 100f, can be a file transfer (e.g., utilizing File Transfer Protocol (ftp)) from the server 100c (in other embodiments, a service request can be initiated from client computing device 100h by administration personnel 100i over communication network 100g). The amount of time to complete the transfer can be dependent on network congestions associated with communication network 100d, and/or file size as well as possible the load on server 100c. For example, the client computing device 100e can request a file transfer from server 100c as a blocking call and indicates that it can wait 5 seconds (e.g., 5 second timeout for the file transfer to complete). A small file with good networks conditions associated with communication network 100d, can complete the file transfer within 5 seconds such that a blocking call works well. However, with a larger file, and/or with poor network conditions associated with communication network 100d, the file transfer can take 10 seconds to transfer, beyond the time (e.g. 5 second timeout) the client computing device 100e is willing to wait. Thus, in one or more embodiments, the server 100c can provide a message to the client computing device 100e prior to the timeout such that the message indicates that processing the service is taking longer than expected. Such messaging can function as a heartbeat on the blocking call. In response to the message, the client computing device can act in one of three ways. First, it can abandon the blocking call thereby terminating the service request and allocating the client computing device resources that were previously allocated to the service request for the blocking call to perform other tasks. Second, the client computing device can send a message to server to continue processing the service as a blocking call, and provide another timeout to the server. Third, the client computing device can send a message to the server to convert the service request to a non-blocking call (NBC) so that it can re-allocate its resources from the service request to perform other tasks. The only drawback is that the client computing device cannot monitor the way in which the service operation failed to properly debug or troubleshoot the cause of the service failure.

A blocking call can also be referred to as synchronous messaging between the client computing device 100e and the server 100c. That is, both client computing device 100e and the server 100c allocate resource threads (e.g., processor capacity, memory, other resources, etc.) for the blocking call requesting the service and provides synchronous messaging between the client computing device resource thread and the server resource thread. A non-blocking call can also be referred to as asynchronous messaging. That is, the client computing device 100e sends a request for the service to server 100c but allocates no resources to messaging or monitoring the service processing/completion by the server 100c. The server 100c allocates no resources to messaging the client computing device 100e while the server 100c processes the request for service. The server 100c can provide a message upon completion of the service to the client computing device 100e to notify it accordingly. The embodiments described herein that discuss converting a blocking call to a non-blocking call can be referred to conducting semi-synchronous messaging. That is, an initial portion of requesting the service and processing the service by the client computing device and server, respectively, can be performed with synchronous messaging (e.g., the blocking call portion) but a subsequent portion of processing the service to completion can be performed with asynchronous messaging (e.g., the non-blocking call portion).

Referring to FIG. 2A, in one or more embodiments, system 200 illustrates a client computing device 200a and server 200b requesting, continuing, and completing a service as a blocking call after an initial timeout. Specifically, the client computing device 200a allocates a resource thread 200i (e.g., a portion of its processor capacity and memory) to the service and sends a message 200c to the server 200b that includes a service request and a timeout as well as a notification that the service is currently a blocking call but should be configured to able to be converted later to a non-blocking call. In response to receiving message 200c, the server 200b can allocate several resource threads to processing/completing the service. One thread 200j can be allocated to handle receiving the first message and another thread 200l to handle processing/completing of the service. Prior to the timeout, the server 200b can send a message 200d to the client computing device 200a using thread 200j to indicate that the service is still in-progress (e.g., processing) and will not complete before the timeout expires. In response, the client computing device 200a can send a message 200e using thread 200i that indicates to the server 200b to continue the service as a blocking call and provides another timeout. The server 200b can receive the message using thread 200k. The server 200b continues the processing/completing the service using thread 200l. When the service is complete, the server 200b can send a message 200f to client computing device using thread 200k that includes a response that indicates that the service is complete.

Referring to FIG. 2B, in one or more embodiments, system 210 illustrates a client computing device 210a and server 210b requesting a service as blocking call, converting the blocking call to a non-blocking call, and completing a service as a non-blocking call after an initial timeout. Specifically, the client computing device 210a allocates a resource thread 210j (e.g., a portion of its processor capacity and memory) to the service and sends a message 210c to the server 210b that includes a service request and a timeout as well as a notification that the service is currently a blocking call but should be configured to be converted later to a non-blocking call. In response to receiving message 210c, the server 210b can allocate several resource threads to processing/completing the service. One thread 210k can be allocated to handle receiving the first message and another thread 210m to handle processing/completing of the service. Prior to the timeout, the server 210b can send a message 210d to the client computing device 210a using thread 210k to indicate that the service is still in-progress (e.g., processing) and will not complete before the timeout expires. In response, the client computing device 210a can send a message 210e using thread 210j that indicates to the server 210b to convert the blocking call associated with the service to a non-blocking call. The server 210b can receive the message using thread 210l. The server 210b continues the processing of the service using thread 210m. Further, the server 210b can send a message 210f to client computing device 210a using thread 210l that includes a non-blocking call response or acknowledgement. When the service is complete, the server 210b can send a message 210i to client computing device 210a using thread 210m that is a response that indicates that the service is complete. In addition, the client computing device 210a can generate a notification that alerts administration personnel associated with the client computing device 210a that the service is complete.

Figure 3:
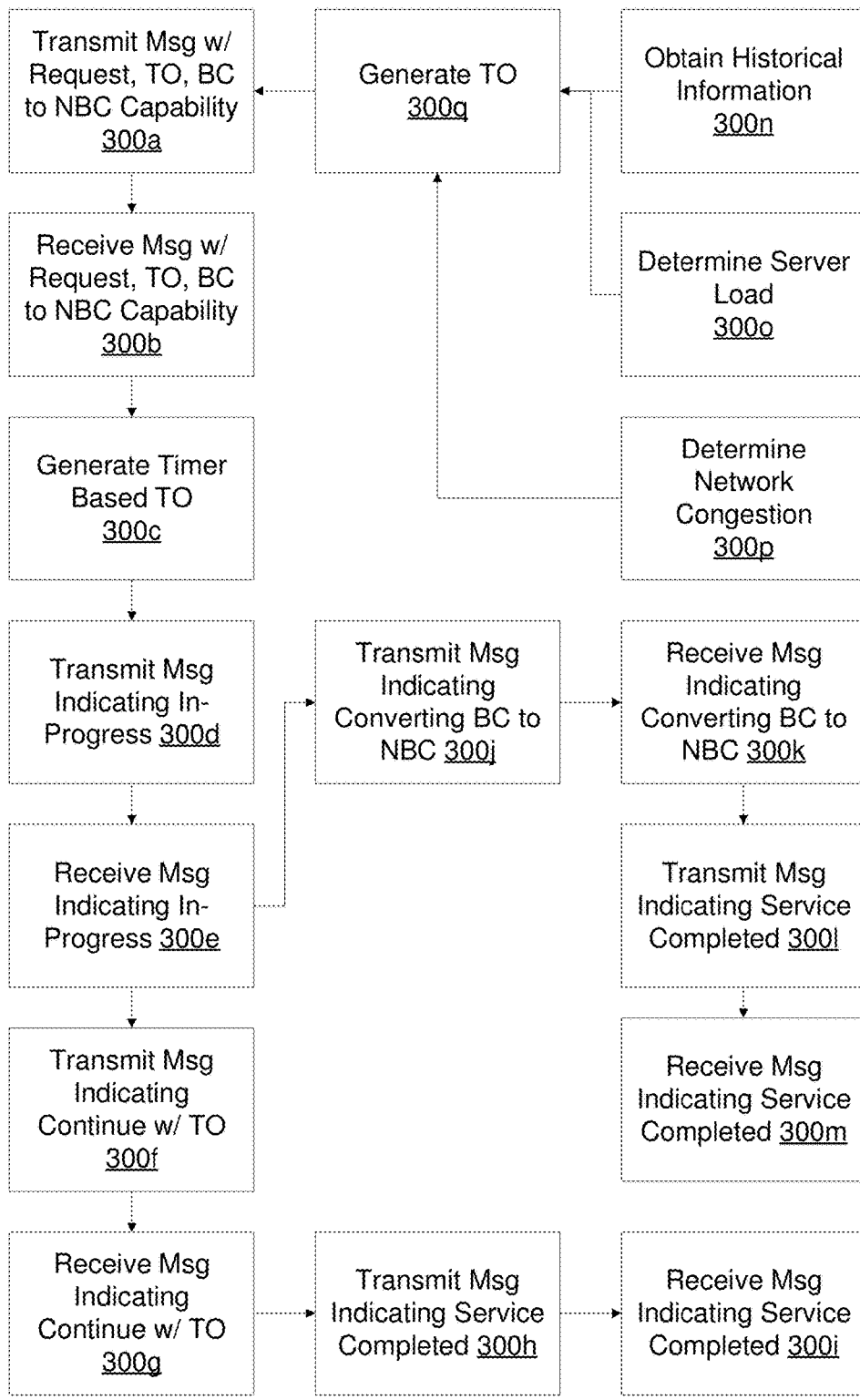
FIG. 3 depicts an illustrative embodiment of a method in accordance with various aspects described herein.

FIG. 3 depicts an illustrative embodiment of a method in accordance with various aspects described herein. In one or more embodiments, aspects of method 300 can be implemented by a client computing device or a server. The method 300 can include a client computing device, at 300a, transmitting a first message to server, the first message includes a request for a service and a first timeout associated with the service as well as a notification directed to the server that the service is to be implemented initially as the blocking call and that the processing of the service configured to be capable of being converted from the blocking call to a non-blocking call. The request causes generation a blocking call associated with the service on the client computing device. Further, the method 300 can include the server, at 300b, receiving the first message from the client computing device, the first message includes the request for the service and the first timeout associated with the service as well as the notification that the service is to be implemented initially as the blocking call and that the service is configured to be capable of being converted from the blocking call to the non-blocking call. In addition, the method 300 can include the server, at 300c, generating a first timer based on the first timeout. The first timer can be configured to be an amount of time less than the first timeout. Also, the method 300 can include the server, at 300d, transmitting, prior to the first timeout expiring and in response to expiration of the first timer, a second message to the client computing device that indicates that the service is in-progress.

In one or more embodiments, the method 300 can include the client computing device, at 300e, receiving, prior to the first timeout expiring, the second message from the server indicating that the service is in-progress. In response to receiving the second message, the client computing device transmits a third message to the server. The third message comprises one of a first instruction to continue with the service as the blocking call or a second instruction to convert the blocking call to a non-blocking call associated with the service. Consequently, the server can receive the third message from the client computing device, and the second message comprises one of the first instruction to continue with the service as the blocking call or the second instruction to convert the blocking call to a non-blocking call associated with the service.

In one or more embodiments, the method 300 can include the client computing device, at 300f, transmitting the third message to the server and the third message includes the first instruction to continue with the service as the blocking call as well as a second timeout. Further, the method 300 can include the server, at 300g, receiving the third message from the client computing device and the third message includes the first instruction to continue processing the service as the blocking call as well as a second timeout. In addition, the method 300 can include the server, at 300h, transmitting a fourth message to the client computing device in response to the first instruction, prior to the second timeout, the fourth message indicates completion of the service associated with the blocking call. Also, the method 300 can include the client computing device, at 300i, receiving the fourth message from the server in response to the first instruction, prior to the second timeout, the fourth message indicates completion of the service associated with the blocking call In one or more embodiments, the method 300 can include the client computing device, at 300j, transmitting the third message to the server and the third message includes the second instruction to convert the blocking call to a non-blocking call associated with the service to continue processing/completing the service. Further, the method 300 can include the server, at 300k, receiving the third message to the server and the third message includes the second instruction to convert the blocking call to a non-blocking call associated with the service. In addition, the method 300 can include the server, at 300l, transmitting a fifth message to the client computing device in response to the second instruction, the fifth message indicates completion of the service associated with the non-blocking call. Also, the method 300 can include the client computing device, at 300m, receiving the fifth message from the server in response to the second instruction, the fifth message indicates completion of the service associated with the non-blocking call.

In one or more embodiments, the method 300 can include the client computing device, at 300q, prior to transmitting the first message that includes the first timeout, generating the first timeout. Further, the method 300 can include the client computing device, at 300n, obtaining historical information associated with the service (e.g., the historical information indicates the completion times of the service in the past). In some embodiments, the client computing device generates the first timeout based on the historical information. In addition, the method 300 can include the client computing device, at 300o, determining a load associated with the server. This can include the client computing device requesting the current load from the server and receiving a response that indicates the current load. In further embodiments, the client computing device generates the first timeout based on the load. Also, the method 300 can include the client computing device, at 300p, determining network congestion of a communication network associated with the server. This can include the client computing device requesting the network congestion from the server and receiving a response that indicates the network congestion. In further embodiments the client computing device generates the first timeout based on the network congestion.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Note, one or more blocks can be performed in response to one or more other blocks.

Further, some portions of embodiments can be combined with portions of other embodiments.

Figure 4:
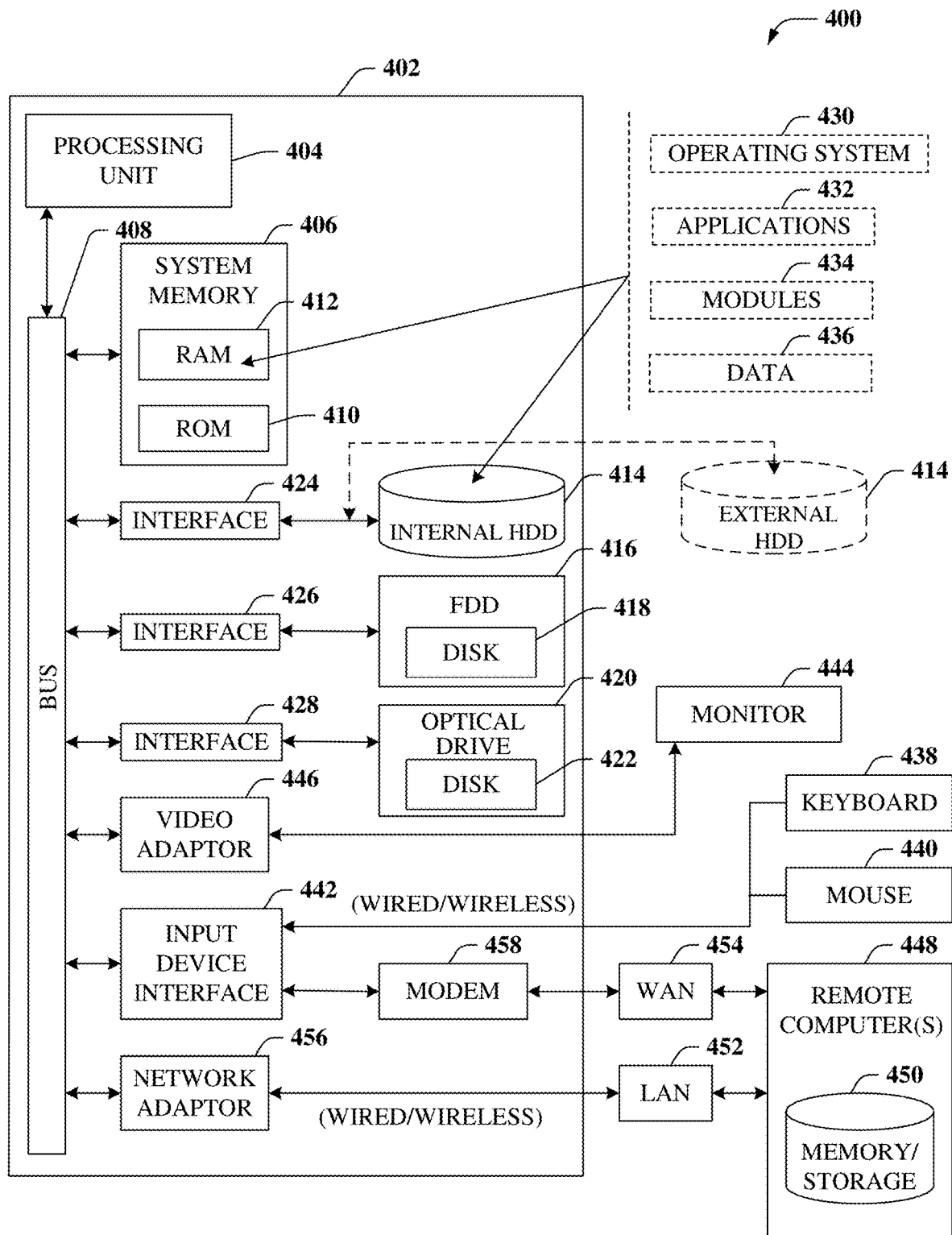
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, the computing environment 400 can be used in computing device described herein. Each of these devices can be implemented via computer-executable instructions that can run on one or more computers, and/or in combination with other program modules and/or as a combination of hardware and software. For example, computing environment 400 can facilitate in whole or in part continuing processing of a service by a server in response to a request from a client computing device as a blocking call after an initial timeout or converting the blocking call to a non-blocking call after an initial timeout. Further, each of the server 100c, client computing device 100e, client computing device 100h, client computing device 200a, server 200b, client computing device 210a, and server 210b can comprise computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies.

Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
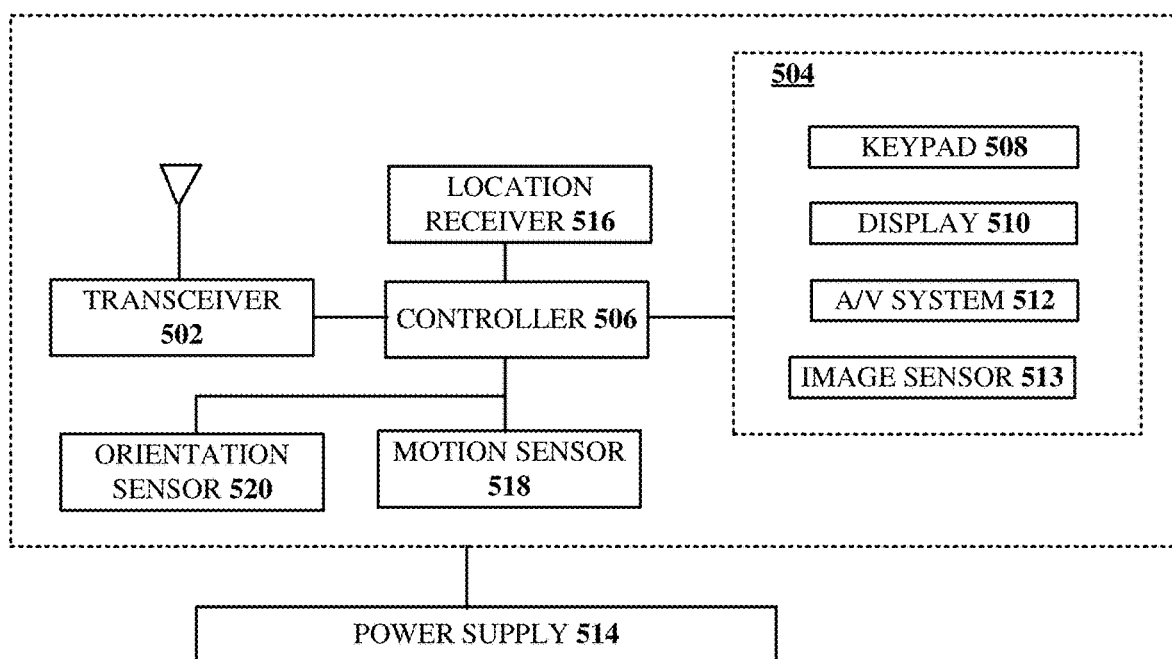
FIG. 5 is a block diagram of an example, non-limiting embodiment of a mobile network platform in accordance with various aspects described herein.

Turning now to FIG. 5, an illustrative embodiment of a communication device 500 is shown. Communication device 500 can facilitate in whole or in part processing of a service by a server in response to a request from a client computing device as a blocking call after an initial timeout or converting the blocking call to a non-blocking call after an initial timeout. Further, each of the server 100c, client computing device 100e, client computing device 100h, client computing device 200a, server 200b, client computing device 210a, and server 210b can comprise communication device 500.

The communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface having graphical user interface (GUI) elements that can be selected by a user with a touch of a finger. The display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high-volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable communications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $X=(x_1, x_2, x_3, x_4 \ldots x_n)$, to a confidence that the input belongs to a class, that is, $f(x)$ =confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A non-transitory machine-readable medium, comprising executable instructions that, when executed by a client computing device including a processor, facilitate performance of operations, the operations comprising:
    transmitting a first message to a server, wherein the first message includes a request for a service and a first timeout associated with the service, wherein the request causes generation of a blocking call associated with the service on the client computing device;
    receiving, prior to the first timeout expiring, a second message from the server indicating that the service is in-progress; and
    transmitting a third message to the server, wherein the third message comprises one of a first instruction to continue with the service as the blocking call or a second instruction to convert the blocking call to a non-blocking call associated with the service.

2. The non-transitory machine-readable medium of claim 1, wherein the third message comprises the first instruction and a second timeout.

3. The non-transitory machine-readable medium of claim 2, wherein the operations comprise receiving a fourth message from the server in response to the first instruction, prior to the second timeout, wherein the fourth message indicates completion of the service associated with the blocking call.

4. The non-transitory machine-readable medium of claim 1, wherein the server generates a first timer based on the first timeout, wherein the server sends the second message in response to an expiration of the first timer.

5. The non-transitory machine-readable medium of claim 1, wherein the operations comprise receiving a fifth message from the server in response to the second instruction, wherein the fifth message indicates completion of the service associated with the non-blocking call.

6. The non-transitory machine-readable medium of claim 1, wherein the operations comprise:
    obtaining historical information associated with the service; and
    generating the first timeout based on the historical information.

7. The non-transitory machine-readable medium of claim 1, wherein the operations comprise;
    determining a load associated with the server; and
    generating the first timeout based on the load.

8. The non-transitory machine-readable medium of claim 1, wherein the operations comprise;
    determining network congestion of a communication network associated with the server; and
    generating the first timeout based on the network congestion.

9. The non-transitory machine-readable medium of claim 1, wherein the first message includes a notification to the server that the service is to be implemented initially as the blocking call and that the service is configured to be capable of being converted from the blocking call to the non-blocking call.

10. A non-transitory machine-readable medium, comprising executable instructions that, when executed by a server including a processor, facilitate performance of operations, the operations comprising:
    receiving a first message from a client computing device, wherein the first message includes a request for service and a first timeout associated with the service, wherein the request causes generation of a blocking call associated with the service on the client computing device;
    transmitting, prior to the first timeout expiring, a second message to the client computing device that indicates that the service is in-progress; and
    receiving a third message from the client computing device, wherein the third message comprises one of a first instruction to continue with the service as the blocking call or a second instruction to convert the blocking call to a non-blocking call associated with the service.

11. The non-transitory machine-readable medium of claim 10, wherein the third message comprises the first instruction and a second timeout.

12. The non-transitory machine-readable medium of claim 11, wherein the operations comprise transmitting a fourth message to the client computing device in response to the first instruction, prior to the second timeout, wherein the fourth message indicates completion of the service associated with the blocking call.

13. The non-transitory machine-readable medium of claim 10, wherein the operations comprise generating a first timer based on the first timeout, wherein the transmitting of the second message comprises transmitting the second message to the client computing device in response to an expiration of the first timer.

14. The non-transitory machine-readable medium of claim 10, wherein the operations comprise transmitting a fifth message to the client computing device in response to the second instruction, wherein the fifth message indicates completion of the service associated with the non-blocking call.

15. The non-transitory machine-readable medium of claim 10, wherein the operations comprise:
    obtaining historical information associated with the service; and generating the first timeout based on the historical information.

16. The non-transitory machine-readable medium of claim 10, wherein the operations comprise;
   determining a load associated with the server; and
   generating the first timeout based on the load.

17. The non-transitory machine-readable medium of claim 10, wherein the operations comprise;
   determining network congestion of a communication network associated with the server; and
   generating the first timeout based on the network congestion.

18. A method, comprising:
   transmitting, by a client computing device including a processor, a first message to a server, wherein the first message includes a request for a service and a first timeout associated with the service, wherein the request causes generation a blocking call associated with the service on the client computing device;
   receiving, by the client computing device, prior to the first timeout expiring, a second message from the server indicating that the service is in-progress; and
   transmitting, by the client computing device, a third message to the server, wherein the third message comprises one of a first instruction to continue with the service as the blocking call or a second instruction to convert the blocking call to a non-blocking call associated with the service.

19. The method of claim 18, comprising receiving, by the client computing device, a fourth message from the server in response to the first instruction, prior to a second timeout, wherein the fourth message indicates completion of the service associated with the blocking call, wherein the third message comprises the first instruction and the second timeout.

20. The method of claim 18, comprising receiving a fifth message from the server in response to the second instruction, wherein the fifth message indicates completion of the service associated with the non-blocking call.

* * * * *